Figure 1:
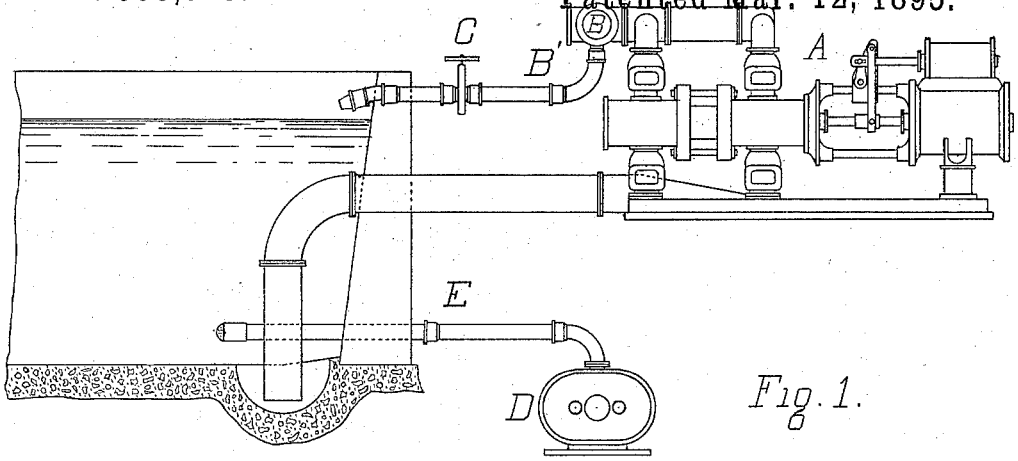

(No Model.) 3 Sheets—Sheet 1.

G. E. WARING, Jr.
SEWAGE DISPOSAL.

No. 535,515. Patented Mar. 12, 1895.

WITNESSES.
G. Everett Hill.
Geo. C. Stoddard.

INVENTOR.
Geo. E. Waring Jr.

(No Model.) 3 Sheets—Sheet 2.

G. E. WARING, Jr.
SEWAGE DISPOSAL.

No. 535,515. Patented Mar. 12, 1895.

WITNESSES.
G. Everett Hill
Geo. C. Stoddard

INVENTOR.
Geo. E. Waring Jr.

(No Model.)  G. E. WARING, Jr.  3 Sheets—Sheet 3.
SEWAGE DISPOSAL.

No. 535,515.  Patented Mar. 12, 1895.

Witnesses.
G. Everett Hill.
Geo. C. Stoddard.

Inventor.
Geo. E. Waring Jr.

UNITED STATES PATENT OFFICE.

GEORGE E. WARING, JR., OF NEWPORT, RHODE ISLAND, ASSIGNOR TO THE DRAINAGE CONSTRUCTION COMPANY, OF BOSTON, MASSACHUSETTS.

SEWAGE DISPOSAL.

SPECIFICATION forming part of Letters Patent No. 535,515, dated March 12, 1895.

Application filed December 28, 1891. Serial No. 416,365. (No model.)

*To all whom it may concern:*

Be it known that I, GEORGE E. WARING, Jr., of the city and county of Newport and State of Rhode Island, have made a new and useful Improvement in Apparatus for Sewage Disposal, of which the following is a specification.

My improvement relates to the preliminary cleansing of sewage and to the means for securing its proper aeration and distribution in such a manner that it may be filtered properly and absorbed in irrigation, or otherwise disposed of.

In the drawings are shown various apparatus of my invention which may be used together to form the sewage disposal plant, also invented by me.

Figure 2:
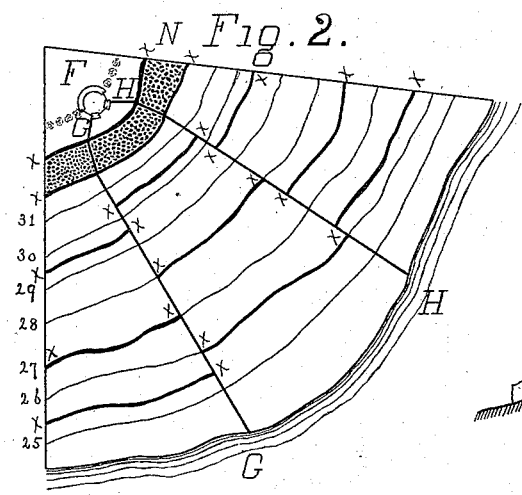
Figure 4:
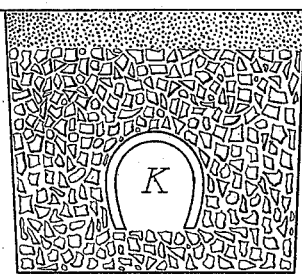
Figure 5:
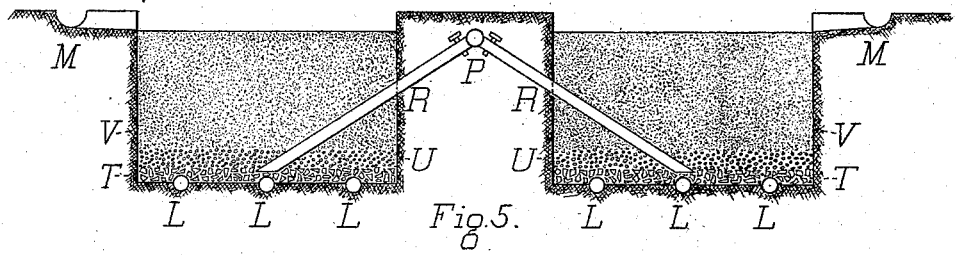

Figure 1 shows a portion of a vertical section of a sewage tank and means for aerating and discharging its contents. Fig. 2 shows an irrigation plant with means for preliminary cleansing and final distribution of the sewage, Fig. 3 being a detail in section showing a construction which may be adopted in the irrigation field. Fig. 4 is a cross section of an improved form of absorption drain. Fig. 5 is a cross section of a pair of filter beds, which in certain cases, may be used between the stone strainer N shown in Fig. 2, and the irrigation field also shown in Fig. 2, Fig. 6 being a plan of a portion of these filter beds, and Fig. 7 a longitudinal section of one of the beds. Fig. 8 is a longitudinal section showing an arrangement of various elements which make up an entire system, by which the desired result can be accomplished.

A is a pump having a force main B for conveying away the sewage. B' is a branch of said main delivering into the tank somewhat above the full line for purposes to be described. C is a valve or gate in this branch which may be opened or closed at pleasure.

D is an air pump discharging its blast through the pipe E, which enters the sewage near the bottom of the tank. One purpose of this tank is to enable the sewage to be thoroughly aerated, and for this purpose an air pump D or other known means may be adopted, but I prefer to use such air pump, as its action is always positive and it operates with thoroughness, and at the same time the flow of air can be easily regulated.

Where there is a force pump, a stream of sewage can be driven down into the tank through the nozzle B', aerating the mass in the manner below described. It is often necessary to use a force pump for the purpose of emptying the tank and forcing the sewage to its point of ultimate discharge, but it is evident that it may be discharged by a siphon or in any other way. This tank is useful to collect the sewage when the flow is small and discharge it in a body. When the flow is large enough to furnish a full and fairly constant stream, the tank may be dispensed with and the sewage treated by the apparatus described below directly as it comes from the sewer.

Figure 6:
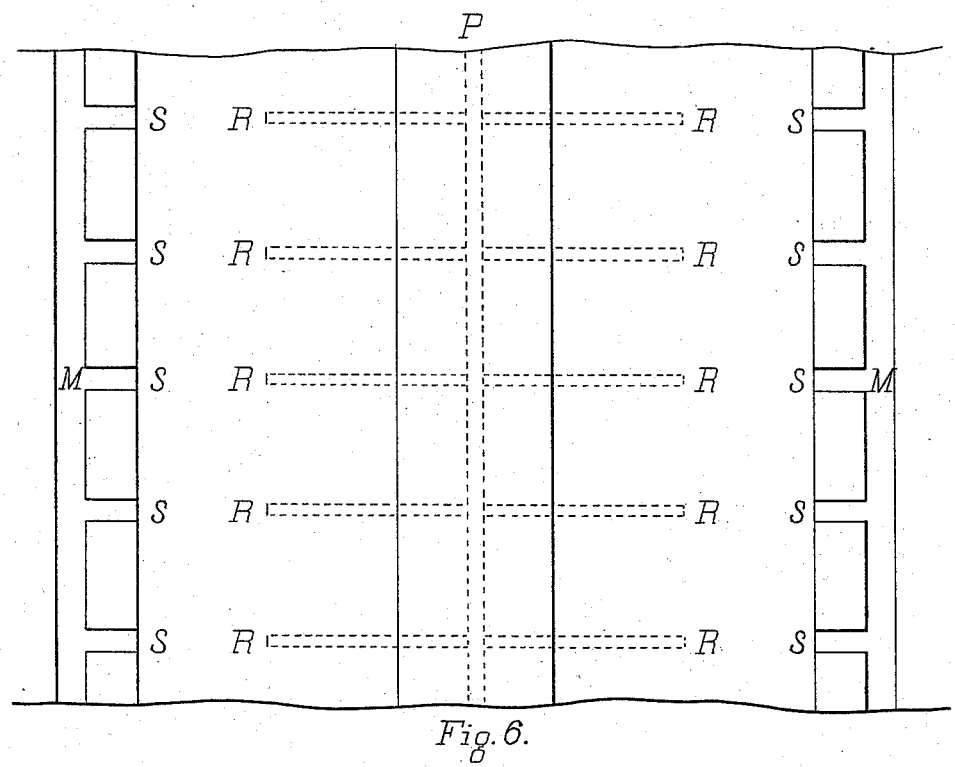
Figure 7:
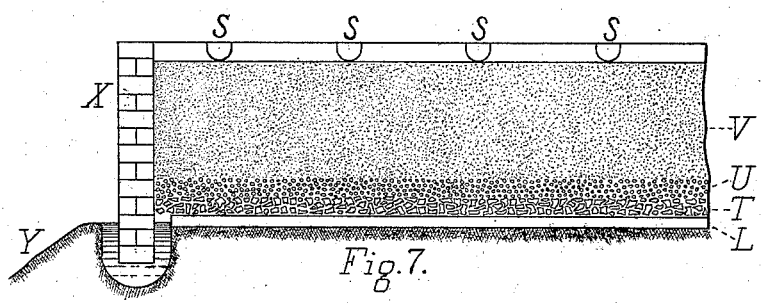
Figure 8:
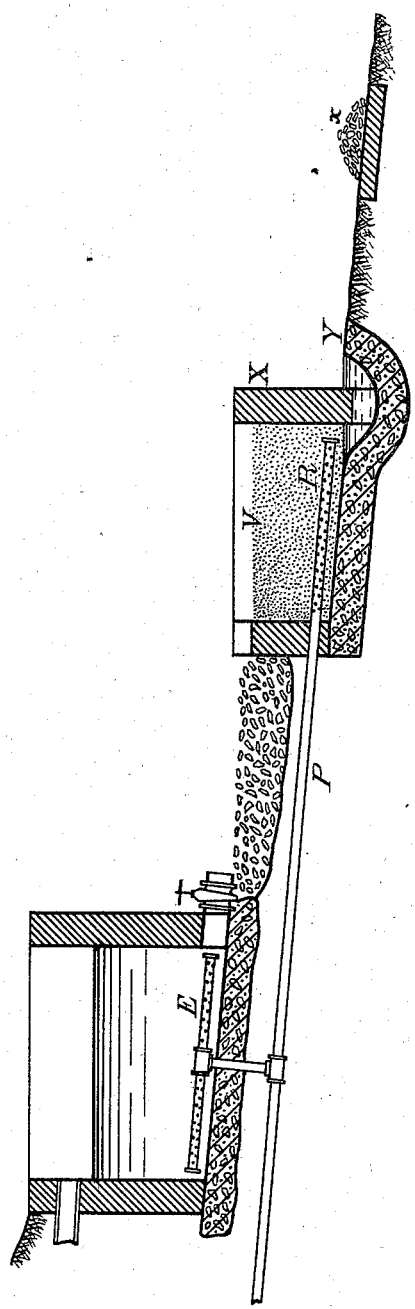

The sewage having been discharged from the tank, is conveyed preferably to filter beds, for example, such as are shown in Figs. 5, 6 and 7, passing thereto over and through a straining area such as is described below. The beds as shown are constructed in parallel lines divided by an embankment. These filter beds should be provided with means for aeration during filtration and for this purpose I provide suitable means such as the pipes R for conveying air under pressure, these pipes being connected with a suitable pipe P running to the compressor. For purposes of even distribution, I prefer to provide a number of such pipes R which shall discharge into an air chamber in the filter, so located that the air will be properly distributed through a filtering medium, but it is evident that this chamber may not be always necessary. The filter beds shown in the drawings contain such an air chamber located below the filtering material, this being as it now seems to me, the best arrangement, and for this purpose may be constructed as follows: An excavation is made, for example, six feet deep and ten feet wide and as long as seems desirable, in view of the quantity of sewage to be filtered. In the bottom of this trench or excavation are longitudinal pipes L for draining, each pipe being partly embedded in the bottom of the trench and partly exposed above it, the joints between the sections of pipe being left open. These drains are for the purpose of securing the free removal of the effluent. The bottom may then be covered to a depth of eight inches, more or less, with broken stone (road metal)

indicated at T, or otherwise provided with a chamber for receiving and distributing compressed air during the process of filtering. This stone may be covered with coarse gravel U of such size and arrangement as will prevent the material of the filter from being washed into the spaces between the broken stone below, the object of this latter being to afford free drainage for the filter with sufficient voids for the ready distribution of air to be introduced, thus forming an air chamber below the gravel, in which air will be more or less compressed. The trenches are then filled with clean mortar sand V or other suitable filtering material.

The terminating wall of the filter is constructed to dip sufficiently into dead water held back by the outfall dam Y. By this means a gate or trap, of simple construction is formed to retain the compressed air which is forced into the chamber T and compel it to pass up through the voids in the filter, and at the same time allow the effluent to pass off. The sewage is delivered to these filter beds by means of a channel M in the bank on the outer side of each of them, with branches S at short intervals to secure an even distribution of sewage over the whole length of the beds, which may be indefinitely extended. The delivery of the sewage is at the top of the filtering material through which liquid may trickle downward while air is moving through the interstices. During the filtering operation air is forced into the air chamber at the bottom of the filter and escapes up through the voids in the filtering material, thus aerating the sewage thoroughly during the filtering process. Suitable valves are provided in the air pipes R so that the air may be forced into the chamber during the filtering process and be shut off at other times. I prefer to use these filter beds alternately, each bed being used, for example, a day or so at a time.

The filtering operation having taken place, the sewage may, for final precipitation, be spread over an irrigation field, such for example, as I will now describe, or it may be delivered into suitable absorption drains located immediately below the surface.

Fig. 2 shows one form of irrigation field which may be used in my process. It should have, if possible, a considerable inclination, over which the sewage is delivered, being first collected in a well F or other distributing device near its highest level. The field is covered for a certain width, with broken stone (road metal) to a depth of six or eight inches or more as shown at N (Fig. 2), thus forming what may be called a strainer. The purpose of this is not only to break and distribute the strong flow from the outlet, leading the sewage uniformly to the ground below, but also to constitute a straining area exposing a large rough surface, to which the coarser materials of the sewage, if there be any, will attach themselves and be held back as by a strainer, as the sewage flows over and through the mass, but in such loose and scattered condition as to admit of rapid oxidation and drying when the flow over this section shall have ceased, the construction of the strainer admitting air to the interior of the mass. Such a strainer is particularly useful in cases where the sewage is treated by chemical precipitation or by filtration. When it gets foul it can easily be shoveled over after being dried, and so freshened as to be used again. Such a strainer however, cannot be used continuously and it must be constructed that it may be drained of its liquid when not in use. It should be made in several sections for alternate use, so that when one section has accumulated its quota of coarse matters, the flow may be transferred to a second, a third, a fourth, &c., giving ample time for the inoffensive decomposition of what has been retained in a section of which the use has been suspended and from which the liquid has drained out. This straining is of course unnecessary at this point if the sewage has been thoroughly filtered, and in that case should take place before the filtering operation. The field is divided by the raised embankments G, G, H, H into three substantially equal parts. The lines marked 25, 26 and 27, &c., indicate contours or lines of equal elevation. The heavier horizontal lines marked $x$, $x$ are embankments to catch the sewage in its flow down the slope, so as to prevent its gathering into channels by giving it a uniform flow over or through each embankment, as the same is reached.

Figure 3:
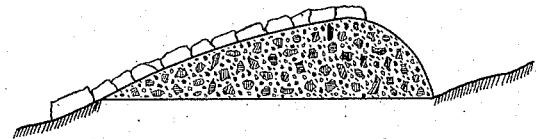

I prefer to use embankments constructed as shown in Fig. 3. They are made of some such material as crushed stone, gravel, coarse sand, railroad cinders or other porous material, which, while offering sufficient resistance to the flow to accomplish the equalizing effect, are sufficiently porous to allow the sewage ponded behind the embankment to leech away after the main flow has ceased. If the material is light or unstable, it may be held in place by a paving or backing of stones or other suitable material adequate to withstand the flow of the irrigating stream passing over the bank. The depression thus formed above the embankment serves the purpose of the furrow, sometimes used in sewage distribution.

The absorption drain may be constructed in the following manner: A trench is dug preferably to the depth of a foot and to a width of somewhat more than one foot. The bottom is filled to a depth of about two inches of crushed stone or coarse gravel or other suitable material, and on this a tile drain K, preferably of as much as four inches opening and preferably of the horse shoe pattern, is placed. The trench is then filled to within a few inches of the surface of the ground and the remainder is filled with earth and may be covered with sod.

The operation of my system of sewage disposal, when carried out by the devices above described, is as follows: Sewage, as produced, is discharged into the tank from the mouth of the sewer until the tank is filled to its full line or nearly so. Air is then forced into the sewage by the air pump D, or in some other suitable way, for a considerable time, the movement of the sewage caused by the force of the current leading to the distribution of the air throughout the whole mass, until the same becomes thoroughly aerated, any gaseous results of decomposition which it may contain, being driven out by the process. Instead of this method of aeration however, the jet B' may be used, the gate C being opened and the pump throwing a stream of sewage through the air into the tank. The stream, on being thrown from the nozzle, will collect air, carrying it into the tank and producing an aerating effect and giving even a more thorough stirring up to the contents of the tank than when the air pump is used. It is evident that these two modes of aeration may be carried on simultaneously. When the sewage has been sufficiently aerated, the gate C being closed, the sewage is driven through the force main B to be filtering trenches, first being passed through the strainer N, where the larger materials are held back. It is distributed by means of the carriers M and their branches S on to the top of the filter bed. The sewage will diffuse itself through the filtering material, and after having passed this, it will go through the gravel and broken stone below, flowing out ultimately under the wall X through the trap formed by the overflow Y. In its passage through the filter, after the nitrifying process incident to the contact of sewage with air, shall have been set up, the sewage will be more or less purified, the degree of purification depending upon the adequacy of the air contained in the filter to supply the oxygen needed for purification. If only so much sewage is applied as will consume the oxygen of the naturally contained air, purification will be practically complete. If more sewage than this is supplied, purification will be less complete, and in this case it is desirable to supply air artificially as by means of the air supply pipes P, R. The air from the pipes P, R, entering under pressure and being confined by the trap at the outlet of the filter, will escape upward through the filter and will greatly increase the amount of oxygen available for nitrification, the extent of this effect depending largely upon the freedom with which air can pass through the voids of the filtering material. From the filter the effluent collected in the pipes L, L is conveyed out over the trap Y to the irrigation field, where it may enter the distributing well F and then be discharged, or may be allowed to flow directly through absorption drains, or to flow down the slope, having its flow equalized and restrained by the porous embankments x, x, thus being distributed with desired uniformity over the surface by which it is to be absorbed. The accumulations of sewage will overflow the embankments or will gradually leech away, and if necessary, the upper side of the embankments may be raked over from time to time. Such a field should be divided into parts used alternately, as for example one day out of three.

It is evident that the various portions of my invention may be differently disposed with relation to each other, from the manner which I have described. When used however, as I have described their use, they form a complete system which will handle a very large quantity of sewage matter, producing an effluent of the highest purity. It is evident however, that the tank may be connected either to the irrigation field directly without the use of the filter, in which case it takes the place of the distributing well F in Fig. 2, and that in many cases the filter beds will be sufficient without the use of the irrigation area to supplement their effect, depending perhaps on the degree of purification required, in which case the strainer N should be located between the tank or sewer outlet and the filter.

The filter above described shows an outlet trapped in such a way as to discharge the effluent freely but confine the air so that it can escape only up through the filter during the filtering process, the resistance to its upward passage being less than the resistance to its outward passage. The main novelty of this part of my invention however, consists in a filter so constructed that its contents may be thoroughly aerated during the filtering operation and to secure this result other modifications may be adopted. Moreover the drain pipes, while they serve to collect the effluent, are so few in number and are so placed as not to interfere with the free circulation of air, and on the other hand the pipes by which the air is distributed, are so arranged that the air can pass freely from them throughout the filtering medium.

I am aware that it is a custom as old as the practice of irrigation to provide gutters in the earth, banks of earth or other forms of tight dam to arrest the flow of the irrigating liquid and give it a fresh start over land lying below. I do not therefore claim such dams or barriers broadly; but I do claim the construction of dams or barriers of open porous material, as described, which will somewhat obstruct the flow, allowing the liquid to pass through them or over them, or both. The difference is that the old device of tight dams or barriers retained liquid behind them after the irrigating flow had ceased. In the case of sewage, this retained flow putrifies and becomes offensive and dangerous. By the use of my embankment a sufficient obstruction is formed, while the porosity of the material allows the retained liquid to flow away before it can putrify.

What I claim as my invention is—

1. A plant for purification and disposal of sewage consisting of a tank provided with means for aerating its contents, a strainer, a filter bed also provided with means for aerating its contents during the filtering operation, and an irrigation area all arranged together in the manner described whereby oxidation of the sewage is first accomplished and it is then distributed, as and for the purposes set forth.

2. In a sewage disposal plant, the filter above described, having an air chamber, a layer of filtering material above this and an air retaining outlet located below the filtering medium and adapted to compel the air to pass off through the filter while allowing the free discharge of the effluent, all as and for the purposes set forth.

3. In a sewage disposal plant, the filter above described, in combination with means substantially as described whereby air under pressure may be fed to said filter, said filter having an air chamber above which is suitably supported a layer of sand or other filtering material and provided with an outlet trapped to prevent the escape of air therefrom and cause said air to escape through the filtering material and at the same time allow the escape of the effluent, all as set forth.

4. In a sewage disposal plant a filter having a bottom of broken stone or the like covered with suitable filtering material and provided with an outlet at or below the level of the broken stone layer, trapped to prevent the escape of air, the whole arranged to allow the air to pass off through the filtering material, in combination with air pipes communicating with the voids in said filter and suitable means for supplying the air under pressure thereto, all as and for the purposes set forth.

5. In a sewage disposal plant the filter above described having an air chamber provided with an outlet trapped to prevent the escape of air, above which is supported a layer of filtering material free for the escape of air, in combination with one or more series of draining pipes located in said filter in the manner described whereby circulation of air may be maintained therein, irrespective of said drain pipes, as set forth.

6. That process of purifying sewage which consists in diffusing it over a confined bed of small stone or the like, whereby the solid particles shall be held back and caught and the effluent allowed to escape, and during the said process of diffusion, subjecting the sewage to a process of oxidation by the constant circulation of air or the like throughout the said confined bed under a pressure greater than the atmosphere, all as set forth.

7. That method of treating sewage which consists in discharging it upon a sloping area provided at intervals with equalizing barriers, having open voids which allow portions of it to pass through, retaining other portions therein, thus retarding the mass sufficiently in its course to cause its equal spreading and yet allowing the ultimate escape of the liquid portions, all as set forth.

8. That method of treating a sewage flow which consists in passing it through one of a series of barriers of broken stone or the like whereby the coarser portions of the sewage will be held back, and allowing the liquid to drain off, and when said barrier has become more or less choked with solid matters, turning said flow to another barrier and allowing said first barrier to clear and purify itself by contact with the atmosphere, as set forth.

GEO. E. WARING, JR.

Witnesses:
G. EVERETT HILL,
C. E. BURLEIGH.